(12) United States Patent
Lin et al.

(10) Patent No.: US 10,915,431 B2
(45) Date of Patent: Feb. 9, 2021

(54) APPARATUS AND APPLICATION INTERFACE TRAVERSING METHOD

(71) Applicant: TENCENT TECHNOLOGY (SHENZHEN) COMPANY LIMITED, Shenzhen (CN)

(72) Inventors: Chen Lin, Shenzhen (CN); Xiaoxia Chen, Shenzhen (CN); Yongde Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 64 days.

(21) Appl. No.: 16/358,774

(22) Filed: Mar. 20, 2019

(65) Prior Publication Data

US 2019/0213114 A1 Jul. 11, 2019

Related U.S. Application Data

(63) Continuation of application No. PCT/CN2017/107288, filed on Oct. 23, 2017.

(30) Foreign Application Priority Data

Nov. 1, 2016 (CN) .......................... 2016 1 0942112

(51) Int. Cl.
   *G06F 11/00* (2006.01)
   *G06F 11/36* (2006.01)
   *G06F 3/0484* (2013.01)

(52) U.S. Cl.
   CPC ........ *G06F 11/3676* (2013.01); *G06F 3/0484* (2013.01); *G06F 11/36* (2013.01); *G06F 11/3672* (2013.01)

(58) Field of Classification Search
   CPC ... G06F 11/3676; G06F 11/36; G06F 11/3672
   See application file for complete search history.

(56) References Cited

U.S. PATENT DOCUMENTS

2016/0162590 A1    6/2016  Fried
2018/0039570 A1*   2/2018  Rajagopalan ....... G06F 11/3688

FOREIGN PATENT DOCUMENTS

| CN | 103455414 A | 12/2013 |
| CN | 105138357 A | 12/2015 |
| CN | 105302715 A | 2/2016 |

OTHER PUBLICATIONS

International Search Report dated Feb. 5, 2018 in PCT/CN2017/107288, with English translation.
Written Opinion dated Feb. 5, 2018 in PCT/CN2017/107288.

* cited by examiner

*Primary Examiner* — Katherine Lin
(74) *Attorney, Agent, or Firm* — Oblon, McClelland, Maier & Neustadt, L.L.P.

(57) ABSTRACT

An apparatus including processing circuitry and an application interface traversing method are described. The processing circuitry selects a target interface from a plurality of interfaces of an application to be tested. The target interface is associated with at least one of a control element, a sub-interface, and a parent interface. The processing circuitry obtains a first control list for the target interface. The first control list indicates whether the at least one of the control element, the sub-interface, and the parent interface has been traversed. The processing circuitry determines, based on the first control list, whether the target interface is associated with a non-traversed interface corresponding to one of the at least one of the control element, the sub-interface, and the parent interface. When the target interface is determined to be associated with the non-traversed interface, the processing circuitry selects the non-traversed interface to update the first control list.

20 Claims, 6 Drawing Sheets

APPARATUS AND APPLICATION INTERFACE TRAVERSING METHOD

RELATED APPLICATION

This application is a continuation of International Application No. PCT/CN2017/107288, filed on Oct. 23, 2017, which claims priority to Chinese Patent Application No. 201610942112.8, filed with the Chinese Patent Office on Nov. 1, 2016. The entire disclosures of the prior applications are hereby incorporated by reference in their entirety.

FIELD OF THE TECHNOLOGY

This application relates to the field of computer technologies.

BACKGROUND OF THE DISCLOSURE

Before application software is officially published, each interface of the application needs to be traversed, to check correctness of interface display in different languages.

In a related technical solution, generally, each interface of a tested application is traversed in a manual manner. Because of a large quantity of language types and a large quantity of interfaces of a tested application, an interface traversing process is excessively complex. In addition, in the interface traversing process, a user needs to manually view and test all application interfaces, and each interface may be associated with a plurality of sub-interfaces. Therefore, the user cannot ensure that each traversed interface is a new interface and no non-traversed interface is caused by omission. It can be learned that the manual operation manner easily causes a problem that in an interface traversing process, an interface is omitted, the workload is high, and the efficiency is low.

SUMMARY

In view of this, embodiments of this application provide an application interface traversing method and system, and a test device, to resolve a problem that during manual traversing of all applications, interface omission easily occurs and the traversing efficiency is low.

According to aspects of the application, an apparatus including processing circuitry and an application interface traversing method are described. The processing circuitry selects a target interface from a plurality of interfaces of an application to be tested. The target interface is associated with at least one of a control element, a sub-interface, and a parent interface. The processing circuitry obtains a first control list for the target interface. The first control list indicates whether the at least one of the control element, the sub-interface, and the parent interface has been traversed. The processing circuitry determines, based on the first control list, whether the target interface is associated with a non-traversed interface corresponding to one of the at least one of the control element, the sub-interface, and the parent interface. When the target interface is determined to be associated with the non-traversed interface, the processing circuitry selects the non-traversed interface to update the first control list. In an embodiment, the plurality of interfaces includes an uppermost interface. When the target interface is determined not associated with the non-traversed interface, the processing circuitry is further configured to determine whether the target interface is the uppermost interface. When the target interface is determined to be the uppermost interface, the processing circuitry determines that each of the plurality of interfaces has been traversed. When the target interface is determined not to be the uppermost interface, the processing circuitry selects an upper layer interface of the target interface, and updates the target interface to be the upper layer interface.

In an embodiment, the processing circuitry determines whether the target interface is associated with a control element that is not traversed. When the target interface is determined not associated with the non-traversed control element, the processing circuitry determines whether the target interface is associated with a sub-interface that is not traversed. When the target interface is determined not associated with the non-traversed sub-interface, the processing circuitry determines whether the target interface is associated with a parent interface that is not traversed. When the target interface is determined not associated with the non-traversed parent interface, the processing circuitry determines that the target interface is not associated with the non-traversed interface.

In an embodiment, when the target interface is associated with a traversed one of the at least one of the control element, the sub-interface, and the parent interface, the processing circuitry obtains, from a preset database, the first control list corresponding to the target interface. When the target interface is not traversed, the processing circuitry obtains a second control list by processing the target interface where the first control list is identical to the second control list.

In an embodiment, the processing circuitry processes the target interface to obtain a second control list for the target interface and determines, according to the second control list, whether the target interface is associated with a traversed one of the at least one of the control element, the sub-interface, and the parent interface. When the target interface is determined to be traversed, the processing circuitry obtains, from a preset database, the first control list corresponding to the target interface. When the target interface is determined not to be traversed, the processing circuitry sets the second control list to be the first control list and stores the second control list into the preset database.

In an embodiment, the processing circuitry obtains the second control list that matches the target interface by testing the target interface with a UiAutomator testing framework. Further, the processing circuitry traverses the second control list to obtain one or more effective control elements of the target interface where the one or more effective control elements includes one or more of clickable control elements, static control elements, dynamic control elements, and text control elements. The processing circuitry generates coordinate information that indicates coordinate values for the one or more effective control elements and determines whether the target interface is traversed based on the generated coordinate information and a traversed interface list that includes coordinate information for a set of traversed interfaces of the plurality of interfaces.

In an embodiment, the second control list includes a static control sub-list and a dynamic control sub-list. The processing circuitry obtains the dynamic control sub-list by 1) moving a motion control element according to a preset rule to obtain a plurality of continuous display interfaces for the target interface, 2) detecting, by the UiAutomator testing framework, one or more control elements in each of the plurality of continuous display interfaces, and 3) adding the one or more control elements in the respective display interfaces to the dynamic control sub-list.

In an embodiment, the processing circuitry moves, according to the preset rule, the motion control element from a first location to a second location. A first display interface of the plurality of continuous display interfaces corresponds to the motion control element at the first location, a first control element in the first display interface is marked as a first reference control element of the first display interface, a last control element in the first display interface is a tail control element of the first display interface. Further, a second display interface of the plurality of continuous display interfaces corresponds to the motion control element at the second location, and the tail control element of the first display interface is in the second display interface and is used as a second reference control element of the second display interface.

In an embodiment, the processing circuitry determines, according to the first control list and a traversed interface list corresponding to a set of traversed interfaces of the plurality of interfaces, whether the set of traversed interfaces includes a similar interface of the target interface. When the set of traversed interfaces includes the similar interface of the target interface, the processing circuitry obtains one or more traversed effective control elements from the similar interface. For each of one or more effective control elements in the first control list, when the respective effective control element is identical to one of the one or more traversed effective control elements in the similar interface, the processing circuitry marks the respective effective control element in the first control list as being traversed. The processing circuitry determines, based on a marking result, whether the one or more effective control elements in the target interface is traversed. A number of different effective control elements between the target interface and the similar interface is less than a positive integer N.

In an embodiment, when the target interface is determined to be associated with the non-traversed control element, the processing circuitry triggers the non-traversed control element and selects the non-traversed interface corresponding to the non-traversed control element. The processing circuitry updates the first control list by marking the non-traversed control element as a traversed control element in the first control list and stores a jump relationship between the non-traversed control element and the non-traversed interface corresponding to the non-traversed control element.

Aspects of the disclosure also provide a non-transitory computer-readable storage medium storing instructions which when executed by a computer cause the computer to perform the application interface traversing method.

Based on the foregoing technical solutions, in the application interface traversing method provided in the embodiments of this application, a tested application is entered, an entered interface is used as a target interface, a control list of the target interface is obtained, whether a non-traversed control, sub-interface, or parent interface exists in the target interface is determined; and if yes, an interface corresponding to the non-traversed control, the non-traversed sub-interface, or the non-traversed parent interface is entered; or if all controls, sub-interfaces, and the parent interfaces of the target interface are traversed, whether the target interface is a main interface is determined; and if yes, it is determined that application interface traversing is completed; or if not, an upper layer interface of the target interface is returned to, the upper layer interface is used as the target interface, and the control list of the target interface is obtained again and a subsequent step is performed until it is determined that the target interface is the main interface. In this case, the target interface is the main interface, and all the controls, sub-interfaces, and parent interfaces of the target interface are traversed. Therefore, it may be considered that all interfaces under a main interface layer are traversed, so that it may be determined that interface traversing of the tested application is completed. It can be learned that in this application, all the interfaces of a tested application are automatically traversed and no interface is missed. In addition, in some embodiments, a user only needs to view display content of the traversed interfaces, thereby improving the traversing efficiency.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. The accompanying drawings in the following description show merely the embodiments of the present disclosure, and a person of ordinary skill in the art may still derive other drawings from these accompanying drawings.

DESCRIPTION OF EMBODIMENTS

Figure 1:
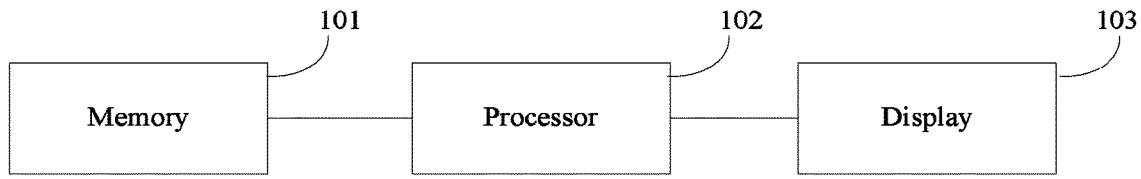
FIG. 1 is a schematic diagram of a hardware architecture according to an embodiment of this application.

The following clearly and completely describes the technical solutions in the embodiments of this application with reference to the accompanying drawings in the embodiments of this application. The described embodiments are merely some embodiments of this application rather than all of the embodiments. All other embodiments obtained by a person of ordinary skill in the art based on the embodiments of this application shall fall within the protection scope of this application.

In an application interface traversing manner provided in the embodiments of this application, a user does not need to manually view and test all application interfaces. After a device detects that a tested application (or an application to be tested) is entered (or selected), an entered interface is used as a target interface. In an embodiment, the application includes a plurality of interfaces, the entered interface is one of the plurality of interfaces, and the entered interface is associated with at least one of: a control element, a sub-interface, and a parent interface. Then, a control list of the target interface is obtained, and whether a non-traversed control (or a non-traversed control element), sub-interface, or parent interface exists in the target interface is determined by using the control list. In an embodiment, the control list of the target interface indicates whether the at least one of: the control element, the sub-interface, and the parent interface has been traversed. If the non-traversed control, sub-interface, or parent interface exists, it indicates that not all the application interfaces are traversed, and the non-traversed control, sub-interface, or parent interface needs to be entered for traversing. In an embodiment, the target interface is associated with a non-traversed interface corresponding to one of the at least one of: the control element, the sub-interface, and the parent interface. Therefore, the non-traversed interface can be entered to update the control list. Each time the target interface changes, an interface obtained after the change is used as the target interface. When it is determined that neither the non-traversed control, the non-traversed sub-interface, nor the non-traversed parent interface exists in the target interface, whether the target interface is a main interface (or an uppermost interface) is determined. If the target interface is the main interface, it indicates that all the interfaces under a main interface layer are traversed, so that it can be determined that the application interfaces are traversed, thereby automatically traversing all the interfaces of the tested application. If the target interface is not the main interface, an upper layer interface of the target interface is returned to (or selected), the upper layer interface is used as the target interface, and the control list of the target interface is obtained again and a subsequent step is performed until it is determined that the target interface is the main interface.

FIG. 1 is a schematic diagram of a hardware architecture according to an embodiment of this application. Referring to FIG. 1, the hardware architecture may include a memory 101, a processor 102, and a display 103.

The memory 101 may be configured to store software programs and modules corresponding to the application interface traversing method in the embodiments of this application. The processor 102 may be configured to traverse the interfaces of the tested application one by one by running the software programs and modules stored in the memory 101. The display 103 may be configured to display content of all traversed interfaces to a user.

Figure 2:
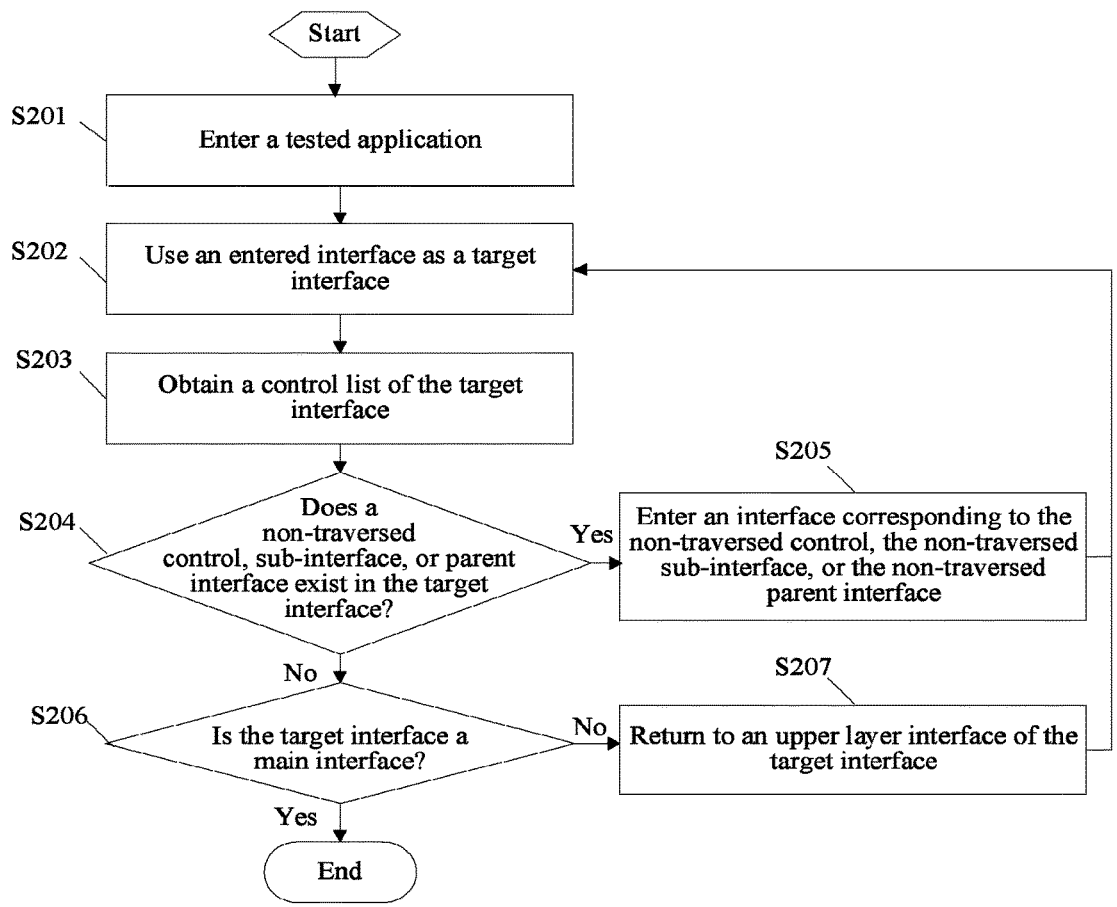
FIG. 2 is a schematic flowchart of an application interface traversing method according to an embodiment of this application.

FIG. 2 is a schematic flowchart of an application interface traversing method according to an embodiment of this application. The method may be applied to an intelligent processing device such as a mobile phone, a tablet computer, or a notebook computer. Referring to FIG. 2, the method may include:

In step S201, enter a tested application.

In this embodiment, when a tested application needs to be traversed, an interface of the tested application is entered first. The interface may be any default interface, for example, a current open interface of the tested application.

Certainly, for ease of traversing, in an implementation, when the tested application needs to be traversed, when the tested application is entered, an entered interface may be a main interface of the tested application. After the main interface of the tested application is entered, the main interface of the tested application may enter a leaf interface (a bottom-layer interface) of the tested application layer by layer according to an interface trigger sequence/layer relationship of the tested application. Then the leaf interface is traversed. An upper layer interface is returned to after traversing of the leaf interface is completed. The interface trigger sequence/layer relationship of the tested application may be a preset trigger rule. For example, a priority is set for each of a control (or a control element), a sub-interface, and a parent interface of a same interface according to a preset rule. When a non-traversed control, sub-interface, and parent interface exist in the interface, an interface having the highest priority is entered first.

The definition of the sub-interface may be: in a traversing process, an interface that appears after the target interface and that a target interface trigger control can reach may be considered as a sub-interface of the target interface. The definition of the parent interface may be: in a traversing process, an interface that appears before the target interface and that can be reached by clicking the target interface may be considered as a parent interface of the target interface. An interface may correspond to a plurality of parent interfaces. For example, interfaces A, B, and C may enter an interface K1 by using a trigger control, so that the interfaces A, B, and C may be parent interfaces of the interface K1.

In step S202, when an interface of the tested application is entered, use the entered interface as a target interface.

In a traversing process, a plurality of the interfaces of the tested application needs to be traversed. Each time an interface is entered, the currently entered interface needs to be analyzed and determined. Therefore, the interfaces of the tested application need to be monitored, so that each time the target interface changes, an interface obtained after the change may be used as the target interface, and the target interface is analyzed and determined.

In step S203, obtain a control list of the target interface.

In this embodiment of this application, each time a new interface is traversed, a control list of the new interface is stored. The control list stores all effective controls (or effective control elements) of each interface. After each effective control is triggered, an interface corresponding to the effective control is entered. Therefore, which controls are traversed controls and which controls are non-traversed controls in the controls of the interface are recorded in a control list storing a new interface.

Therefore, each time an interface is entered, first, it determines whether the current interface is a traversed interface. If the target interface is a traversed interface, it indicates that some controls, sub-interfaces, or parent interfaces in the target interface are traversed. Therefore, a control list matching the target interface may be extracted from a preset database. However, if the target interface is a new interface (that is, a non-traversed interface), the target interface is processed, to obtain a control list of the target interface, and store the control list to the preset database. To help a user view the target interface in a subsequent process, interface layout information and a screenshot of the target interface may be extracted first, and the interface layout information and the screenshot of the target interface are stored to the preset database. Further, layout information and screenshots of all extracted interfaces may further be displayed to the user in a form of a structure tree. In this way, when a user wants to view the target interface, the user may more conveniently see the interface layout information and the screenshot of the target interface.

How to determine whether the target interface is a new interface in this embodiment of this application is described below in detail.

Specifically, when whether the target interface is a new interface is determined, a specific process of S203 may be: processing the target interface, to obtain the control list of the target interface; extracting feature information of the control list; determining, according to the feature information of the control list, whether the target interface is a traversed interface; and when it is determined according to the feature information of the control list that the target interface is a traversed interface, extracting a control list corresponding to the target interface from the preset database, and using the control list extracted from the preset database as the control list of the target interface; or when it is determined according to the feature information of the control list that the target interface is a non-traversed interface, using the control list obtained after the target interface is processed as the control list of the target interface, and storing the control list to the preset database.

In step S204, determine whether a non-traversed control, sub-interface, or parent interface exists in the target interface; and if yes, perform S205; or if all controls, sub-interfaces, and parent interfaces of the target interface are traversed, perform S206.

In this step, a condition of determining whether an interface is traversed is determining whether a non-traversed control, sub-interface, or parent interface exists in the interface. If yes, it indicates that traversing of the interface is not completed. Whether the non-traversed control exists may be viewed by viewing the control list.

In a traversing process, a sub-interface of each interface is entered by triggering a control of the interface. Therefore, two identifiers may be set for each control, one identifier is a control traversing identifier, and the other identifier may be a sub-interface traversing identifier.

Specifically, in a traversing process, after a control is triggered, that is, a control traversing identifier of the control is activated. When no control exists in an interface that is entered after the control is triggered, it indicates that neither a non-traversed control nor a non-traversed sub-interface exists in the interface. Next, a sub-interface traversing identifier of the control is triggered. In this way, whether a non-traversed sub-interface and a non-traversed control exist in the target interface may be determined by determining statuses of a control traversing identifier and a sub-interface traversing identifier of the target interface.

In this embodiment of this application, each sub-interface may correspond to at least one parent interface. When a sub-interface of an interface is entered by using a control of the interface, a parent-child relationship between the two interfaces is recorded. The parent-child relationship is mapped to the entered sub-interface, and the interface in which the control is located is used as a parent interface of the sub-interface, and if all control traversing identifiers and sub-interface traversing identifiers of other controls in the parent interface are activated, a parent interface traversing identifier corresponding to the parent-child relationship is activated. In this case, each time an interface is entered, all parent-child relationships corresponding to the target interface are obtained, and whether a parent-child relationship whose parent interface traversing identifier is not activated exists is determined; and if yes, it indicates that a non-traversed parent interface exists in the target interface; or if not, it indicates that no non-traversed parent interface exists in the target interface.

In step S205, enter an interface corresponding to the non-traversed control, the non-traversed sub-interface, or the non-traversed parent interface, and perform S202. In an embodiment, the control list is updated in step S205.

In step S206, determine whether the target interface is a main interface; and if yes, determine that application interface traversing is completed; otherwise, perform S207.

In this step, each time it is determined that all the controls, sub-interfaces, or parent interfaces of the target interface are traversed, whether the application interface traversing is completed further needs to be determined once. In this case, in this embodiment of this application, the tested application is traversed from a bottom-layer interface. Therefore, whether all the interfaces of the tested application are traversed is determined by determining whether the target interface is the main interface of the tested application; and if the target interface is the main interface, and all the controls, sub-interfaces, and parent interfaces are traversed, it may be considered that all the interfaces under a main interface layer are traversed, so that it may be determined that the interface traversing of the tested application is completed. Specifically, when whether the target interface is the main interface is determined, an upper layer interface of the target interface is returned to by triggering a preset key of a device loading the tested application, and whether the returned upper layer interface is still the target interface is determined; and if the returned upper layer interface is still the target interface, it indicates that the target interface is the main interface of the tested application.

In step S207, return to an upper layer interface of the target interface from the target interface, and perform S202.

Figure 3:
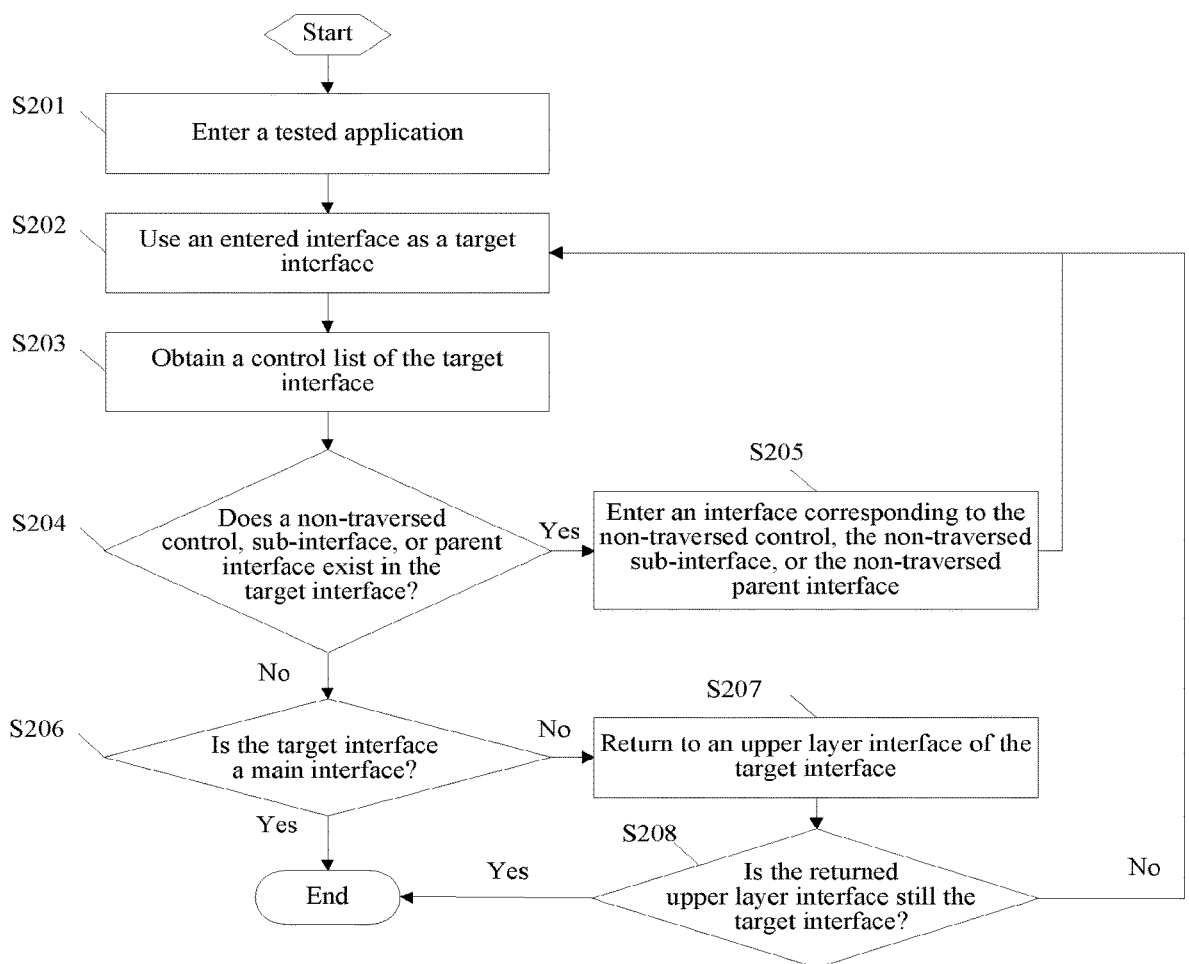
FIG. 3 is a schematic flowchart of an application interface traversing method according to another embodiment of this application.

In this step, if all the controls, sub-interfaces, and parent interfaces of the target interface are traversed, the upper layer interface of the target interface needs to be entered for traversing. For example, an interface A is an upper layer interface of an interface B, and after all the controls, sub-interfaces, and parent interfaces of the interface B are traversed, the interface A is returned to by triggering a preset key of a device loading a current application. For example, the upper layer interface of the target interface is returned to by loading a return key of the device loading the tested application. Certainly, if the target interface is the main interface, the returned upper layer interface is still the target interface. Therefore, referring to the FIG. 3, between S207 and S202, the method may further include: S208: Determine whether the returned upper layer interface is still the target interface; and if yes, determine that the application interface traversing is completed; otherwise, use the returned upper layer interface as the target interface, and perform S202.

It can be learned that, in the traversing method provided in this embodiment of this application, after a tested application is entered, an entered interface is used as a target interface, a control list of the target interface is obtained, whether a non-traversed control, sub-interface, or parent interface exists in the target interface is determined; and if yes, an interface corresponding to the non-traversed control, the non-traversed sub-interface, or the non-traversed parent interface is entered; or if all the controls, sub-interfaces, and the parent interfaces of the target interface are traversed, whether the target interface is a main interface is determined; and if yes, it is determined that application interface traversing is completed; or if not, an upper layer interface of the target interface is returned to, the upper layer interface is used as the target interface, and the control list of the target interface is obtained again and a subsequent step is performed until it is determined that the target interface is the main interface. In this case, the target interface is the main interface, and all the controls, sub-interfaces, and parent interfaces of the target interface are traversed. Therefore, it may be considered that all the interfaces under a main interface layer are traversed, so that it may be determined that interface traversing of the tested application is completed. It can be learned that in this embodiment of this application, all the interfaces of a tested application are automatically traversed and no interface is missed. In addition, in some embodiments, a user only needs to view display content of the traversed interfaces, thereby improving the traversing efficiency.

Figure 4:
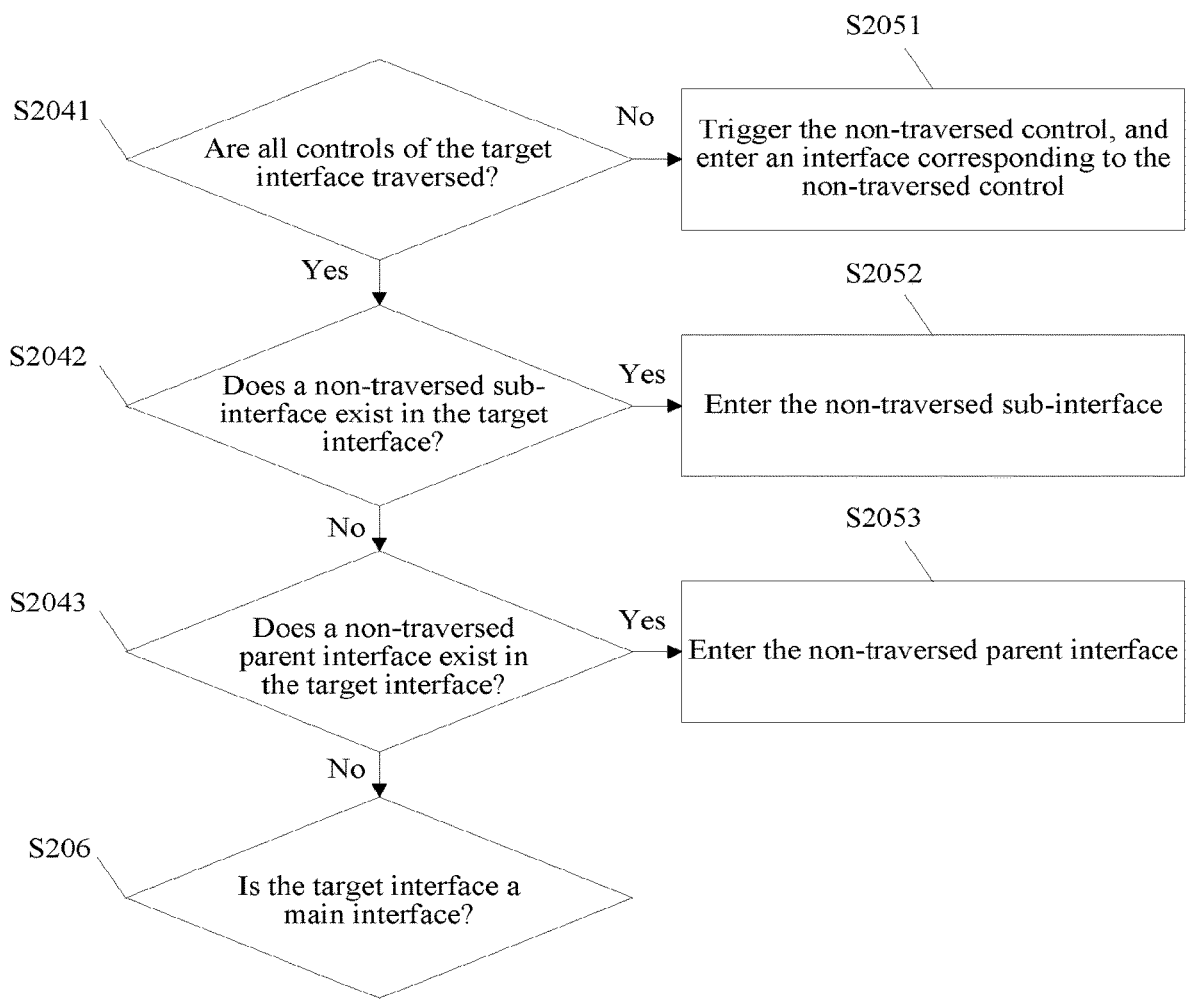
FIG. 4 is a schematic flowchart of determining whether a non-traversed control, sub-interface, or parent interface exists in a target interface according to an embodiment of this application.

In the technical solution disclosed in this application, whether a non-traversed control, sub-interface, or parent interface exists in the target interface may be determined according to a preset sequence. For example, whether a non-traversed sub-interface exists in the target interface is determined first, then whether a non-traversed parent interface exists is determined, and finally whether a non-traversed control exists is determined. Certainly, another determining sequence may be used. For example, referring to FIGS. 4, S204 and S205 may specifically include:

In step S2041, determine whether all the controls of the target interface are traversed; and if a determining result is not, perform S2051; or if a determining result is yes, perform S2042.

For a specific process of determining whether all the controls of the target interface are traversed, refer to the foregoing descriptions.

In step S2042, determine whether a non-traversed sub-interface exists in the target interface; and if yes, perform S2052; or if not, perform S2043.

For a specific process of determining whether a non-traversed sub-interface exists in the target interface, refer to the foregoing descriptions.

In step S2043, determine whether a non-traversed parent interface exists in the target interface; and if yes, perform S2053; or if not, perform S206.

For a specific process of determining whether a non-traversed parent interface exists in the target interface, refer to the foregoing descriptions.

In step S2051, trigger the non-traversed control, and enter an interface corresponding to the non-traversed control.

In step S2052, enter the non-traversed sub-interface.

In step S2053, enter the non-traversed parent interface.

Figure 5:
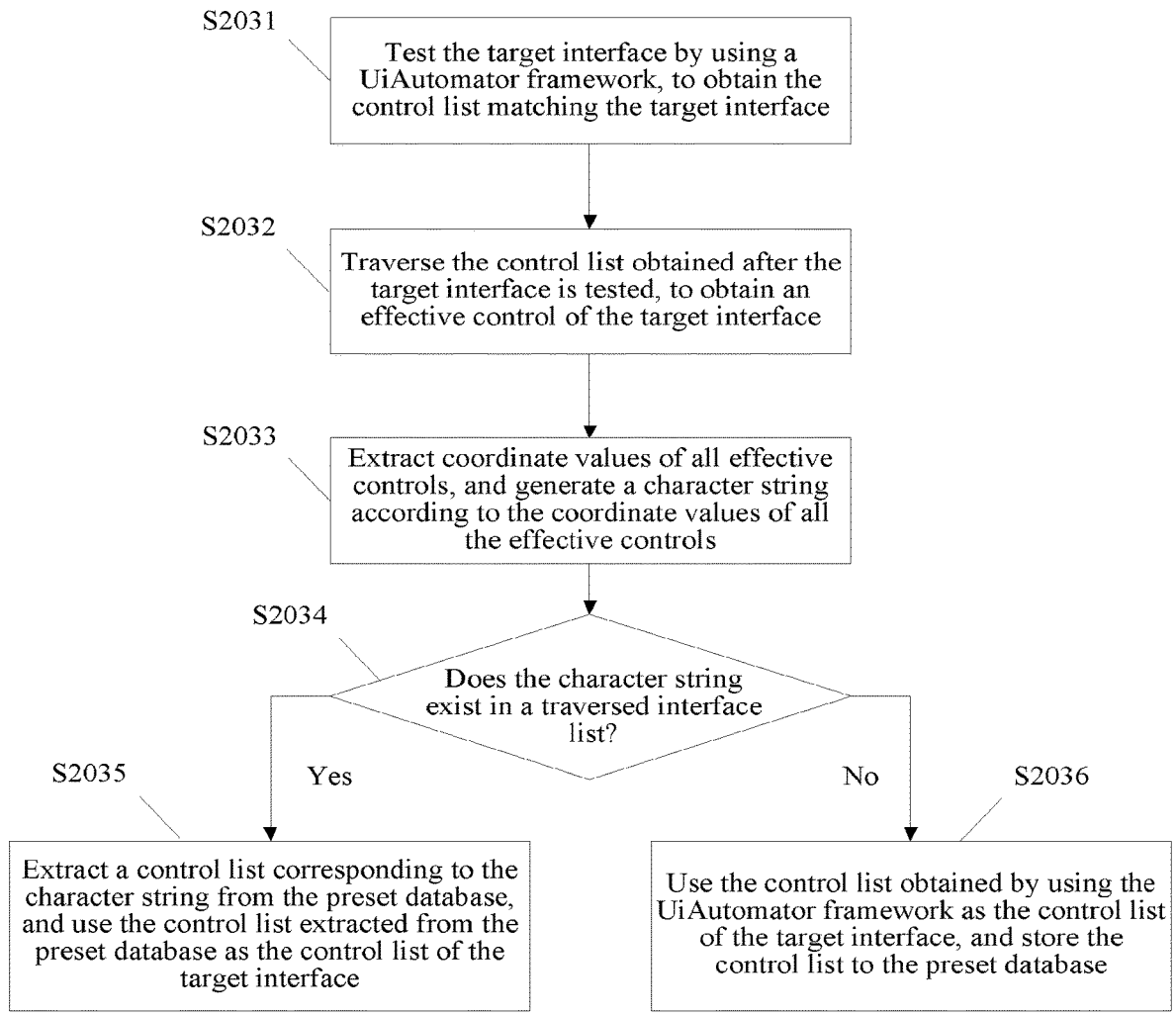
FIG. 5 is a schematic diagram of a process of obtaining a control list of a target interface according to an embodiment of this application.

In another embodiment of this application, a specific manner of the obtaining a control list of the target interface is further disclosed. Referring to FIG. 5, S203 may specifically include:

In step S2031, test the target interface by using a UiAutomator framework (or a UiAutomator testing framework), to obtain the control list matching the target interface.

The UiAutomator framework is a JAVA class library. The UiAutomator framework includes some self-defined UIs (user interface) function tests, to automate and run a test case engine. In this step, the target interface is tested by using the UiAutomator framework, to obtain the control list of the target interface:

In step S2032, traverse the control list obtained after the target interface is tested, to obtain an effective control of the target interface, where the control list stores all the effective controls of the target interface.

In this step, the control list of the target interface is traversed, to obtain the effective control of the target interface. The effective control includes a clickable control, a static control, a dynamic control, a text control, and the like.

In step S2033, extract coordinate values of all the effective controls, and generate a character string according to the coordinate values of all the effective controls. In this step, the coordinate values of all the effective controls may be extracted, and the character string may be generated according to all extracted coordinate values. Certainly, the length of the character string generated in this manner is too long and subsequent use is hindered. In view of this, in this application, the effective controls in the target interface may be grouped first, and effective controls of a same type are grouped into a same group. In the effective controls of each group, coordinates of the first effective control in the group are extracted, and coordinates of the first effective controls of all groups are connected to a long character string, which is a simple layout string of the interface. After the simple layout string is generated, simple layout strings of traversed interfaces are stored to the preset database. Certainly, for ease of determining in a subsequent process, MD5 encoding is performed for the simple layout string first, to obtain a MD5 value corresponding to the simple layout string, and the value is stored to the preset database. In some embodiments, coordinate information that indicates the coordinate values of one or more effective controls are generated. In some examples, the coordinate information includes one or more of: the character string, the simple layout string, the MD5 value corresponding to the simple layout string, and the like.

In step S2034, determine whether the character string exists in a traversed interface list; and if yes, perform S2035; otherwise, perform S2036.

If the MD5 value is stored in the preset database, the determining whether the character string exists in a traversed interface list may be specifically: determining whether the MD5 value exists in the traversed interface list.

Each time an interface is traversed, the character string (the simple layout string) corresponding to the interface is stored to the preset database. Therefore, whether the target interface belongs the traversed interface is determined by querying whether the character string exists in the preset database. If the character string exists in the preset database, it may be determined that the target interface belongs to the traversed interface; otherwise, if the character string does not exist in the preset database, it may be determined that the target interface does not belong to the traversed interface.

In step S2035, extract a control list corresponding to the character string from the preset database, and use the control list extracted from the preset database as the control list of the target interface.

In step S2036, use the control list obtained by using the UiAutomator framework as the control list of the target interface, and store the control list to the preset database.

In the technical solutions disclosed in the foregoing embodiments of this application, when the target interface is tested by using the UiAutomator framework and when the control list matching the target interface is obtained, the control list includes a static control sub-list consisting of static controls, and also includes a dynamic control sub-list consisting of dynamic controls. The static control is a static control that can be seen when the interface is open for the first time. The dynamic control is a control that can be seen by moving a slide control or another rollable control (which is marked as a motion control or a motion control element herein) to a particular location. In various embodiments, a process of obtaining a static control is less complex than a processing of generating a dynamic control sub-list. For example, scanning can be directly performed on the target interface to obtain the static control sub-list. Therefore, the process of obtaining a static control is described in further detail. A process of generating a dynamic control sub-list is described emphasized below. The process of generating a dynamic control sub-list may include: controlling the motion control to move according to a preset rule, to obtain a plurality of continuous display interfaces under (or for) the target interface.

Each time a display interface is obtained, detection is performed by using the UiAutomator framework, and a control in each display interface is added to the dynamic control sub-list.

In the technical solution disclosed in this embodiment of this application, a specific continued manner of the continuous display interfaces may be set according to a user requirement. The continued manner may be selected according to the user requirement.

For example, in the technical solution disclosed in this embodiment of this application, a continuous relationship between the foregoing continuous display interfaces may be as follows: when the motion control is located at the initial location, the first control (or the first control element) in the display interface corresponding to the motion control is marked as a reference control (or a reference control element) of a current display interface, the last control (or the last control element) is used as a tail control (or a tail control element) of the current display interface, a tail control of a previous display interface is located in a next display interface, and the tail control of the previous display interface is used as a reference control of the next display interface.

Figure 6:
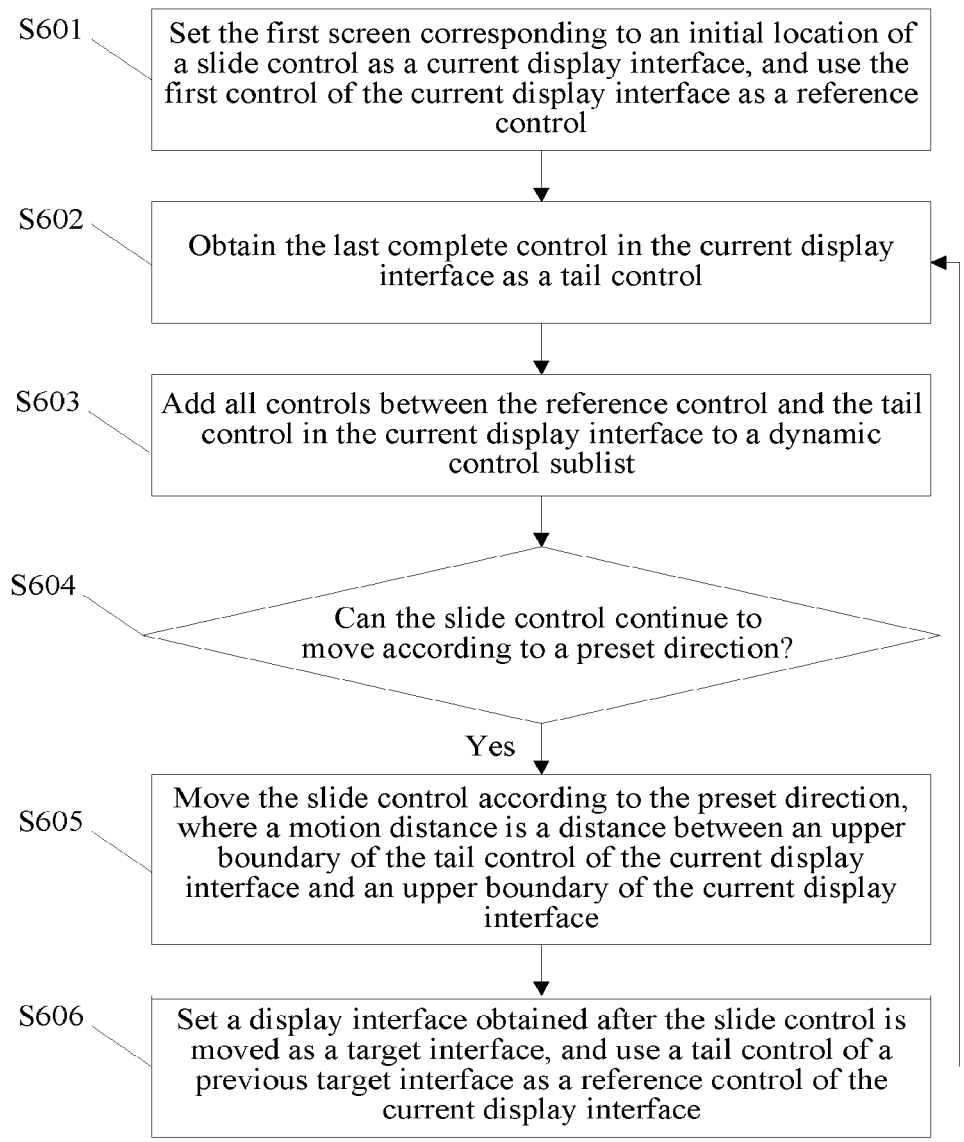
FIG. 6 is a schematic diagram of a process of obtaining a dynamic control sub-list according to an embodiment of this application.

Specifically, referring to FIG. 6, when the motion control is a slide control, a specific process of obtaining the dynamic control sub-list may be as follows:

In step S601, set the first screen corresponding to an initial location of a slide control as a current display interface, and use the first control of the current display interface as a reference control.

In step S602, obtain the last complete control in the current display interface as a tail control.

In step S603, add all controls between the reference control and the tail control in the current display interface to a dynamic control sub-list.

In step S604, determine whether the slide control can continue to move according to a preset direction, and if yes, perform S605.

In step S605, move the slide control according to the preset direction, where a motion distance is a distance between an upper boundary of the tail control of the current display interface and an upper boundary of the current display interface.

In step S606, set a display interface obtained after the slide control is moved as a target interface, use a tail control of a previous target interface as a reference control of the current display interface, and perform S602.

In an embodiment, the motion control is moved according to the preset rule from a first location to a second location. A first display interface of the plurality of continuous display interfaces corresponds to the motion control at the first location. A first control in the first display interface is marked as a first reference control of the first display interface, and a last control in the first display interface is a tail control of the first display interface. A second display interface of the plurality of continuous display interfaces corresponds to the motion control at the second location. The tail control of the first display interface is in the second display interface and is used as a second reference control of the second display interface.

In the technical solution disclosed in this embodiment of this application, when controls of all the interfaces are traversed, it can be learned from S2031 to S2036 that interfaces whose coordinates of effective controls are completely the same are considered as a same interface. However, during actual running, a plurality of similar interfaces exists, and one to two effective controls can differ between these similar interfaces. All the effective controls in these similar interfaces need to be traversed in a common traversing manner. This causes a case in which a same control is traversed for a plurality of times. Consequently, useless traversing is caused, and a traverse time is exponentially increased.

In view of this, to shorten the traversing time, in this embodiment of this application, if 1 to N (N is an empirical value, for example, N may be set to 2) different effective controls exist between two interfaces, the two interfaces are referred to as a same class interface (or a similar interface), that is, the two interfaces are class interfaces of each other.

To accelerate a traversing speed, in the foregoing solution, the determining whether all the controls of the target interface are traversed may specifically include:

obtaining a control list of the target interface;

determining, according to the control list of the target interface and a control list of a traversed interface, whether a class interface of the target interface exists in the traversed interface; and if yes, obtaining a traversed effective control from the class interface; and marking an effective control that is in the control list of the target interface and that is the same as the traversed effective control in the class interface as a traversed control, and determining, according to an obtained marking result, whether all the effective controls of the target interface are traversed In the foregoing solution, after obtaining the control list of the target interface, the control list is compared with a control list of another traversed interface, and whether at least one control list exists in the control list of the another traversed interface is determined. All the effective controls in the control list are the same as all the effective controls in the control list of the target interface; or the control list has effective controls different from those in the control list of the target interface, and a quantity of different effective controls is within an allowance range. If yes, it is considered that the interface corresponding to the control list and the target interface are class interfaces of each other, and a traversed effective control in the interface does not need to be traversed again in the target interface, and an effective control that is in the control list of the target interface and that is the same as the traversed effective control in the interface is marked as a traversed control. If all the effective controls in the target interface are marked as traversed controls, it may be considered that all the effective controls in the target interface are traversed; otherwise, if an effective control that is not marked as a traversed control exists in the target interface, it may be considered that not all the effective controls in the target interface are traversed.

Certainly, in addition to the foregoing manner of determining, by comparing control lists, whether a class interface of the target interface exists, the foregoing character string or MD5 value manner may be used for determining. For example, when the character string corresponding to the target interface is compared with a character string corresponding to a traversed interface, if a difference between the character strings respectively corresponding to the two interfaces is within an allowance range, it may be determined that the two interfaces are class interfaces of each other. For another example, when the MD5 value corresponding to the target interface is compared with a MD5 value corresponding to a traversed interface, if a difference between the MD5 values respectively corresponding to the two interfaces is within an allowance range, it may be determined that the two interfaces are class interfaces of each other.

In the technical solutions disclosed in the foregoing embodiments of this application, to help a user understand a jump relationship between all the interfaces, when a non-traversed control is triggered to enter a new interface, a jump relationship between the non-traversed control and an interface corresponding to the non-traversed control further needs to be stored.

It can be learned that in this embodiment of this application, the control list of the target interface is obtained, whether the class interface of the target interface exists in the traversed interface is determined according to the control list of the target interface and the control list of the traversed interface; and if yes, the traversed effective control in the class interface is obtained, and the effective control that is in the control list of the target interface and that is the same as the traversed effective control in the class interface is marked as the traversed control, and whether all the effective controls of the target interface is determined according to an obtained marking result. In this way, a same effective control in a plurality of interfaces that is class interfaces of each other needs to be traversed once, so that a case in which all the effective controls in the plurality of interfaces that are class interfaces of each other need to be traversed is avoided, thereby shortening a interface traversing time of the tested application.

Figure 7:
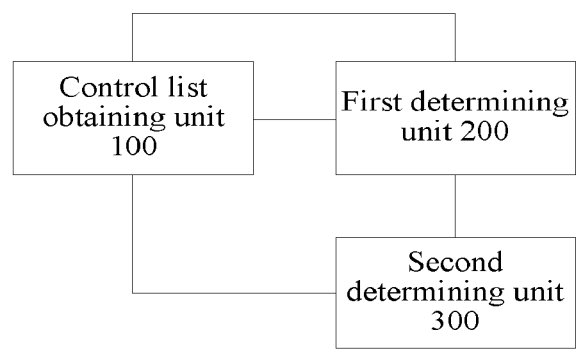
FIG. 7 is a schematic structural diagram of an application interface traversing system according to an embodiment of this application.

Referring to the FIG. 7, corresponding to the foregoing method, this application further discloses an application interface traversing system, including:

a control list obtaining unit 100, configured to: mark a current interface of a current tested application as a target interface, obtain a control list of the target interface, and output a trigger signal to a first determining unit, where the first determining unit 200 is configured to: when obtaining the trigger signal output by the control list obtaining unit, determine whether a non-traversed control, sub-interface, or parent interface exists in the target interface; and if yes, enter an interface corresponding to the non-traversed control in the control list, the non-traversed sub-interface, or the non-traversed parent interface, and obtain, from the control list, the trigger signal output by the unit; or if not, output the trigger signal to a second determining unit; and the second determining unit 300 is configured to: after obtaining the trigger signal, determine whether the target interface is a main interface; and if yes, determine that application interface traversing is completed; or if not, return to an upper layer interface of the target interface, use the upper layer interface as the target interface, and output the trigger signal to the control list obtaining unit.

In the foregoing solution, the application interface traversing system may further include a tested application selection unit. The tested application selection unit may be configured to select and enter a tested application. After entering the tested application, a main interface of the tested application may be entered. When a non-traversed control and a non-traversed sub-interface of the main interface are determined, all interfaces are entered in sequence from the main interface according to an interface trigger sequence/a layer relationship.

Corresponding to the foregoing method, the first determining unit 200 includes:

a control determining unit, configured to: trigger the non-traversed control when the non-traversed control exists in the target interface, enter the interface corresponding to the non-traversed control, and output the trigger signal to the control list obtaining unit; and output the trigger signal to a sub-interface determining unit when the non-traversed control exists in the target interface, where the sub-interface determining unit is configured to: enter the non-traversed sub-interface when the non-traversed sub-interface exists in the target interface, and output the trigger signal to the control list obtaining unit; or output the trigger signal to a parent interface determining unit when neither the non-traversed control nor the non-traversed sub-interface exists in the target interface; and the parent interface determining unit is configured to: when the non-traversed parent interface exists in the target interface, enter the non-traversed parent interface and output the trigger signal to the control list obtaining unit; or when it is determined that no non-traversed parent interface exists in the target interface, determine that all controls, sub-interfaces, and parent interfaces of the target interface are traversed, and output the trigger signal to the second determining unit.

Corresponding to the foregoing method, the control list obtaining unit 100 includes:

a new interface determining unit, configured to: when the target interface is a traversed interface, extract, from a preset database, a control list corresponding to the target interface; or when the target interface is a non-traversed interface, use a control list obtained after the target interface is processed as the control list of the target interface.

Specifically, the new interface determining unit may be specifically configured to: process the target interface, to obtain the control list of the target interface; determine, according to the control list, whether the target interface is a traversed interface; and when the target interface is a traversed interface, extract the control list corresponding to the target interface from the preset database, and use the control list extracted from the preset database as the control list of the target interface; or when the target interface is a non-traversed interface, use the control list obtained after the target interface is processed as the control list of the target interface, and store the control list to the preset database.

Corresponding to the foregoing method, to conveniently obtain the control list of the target interface by processing the target interface, the new interface determining unit includes:

a UiAutomator framework, configured to test the target interface, to obtain the control list matching the target interface; and a sub new interface determining unit, configured to: traverse the control list obtained after the target interface is tested, to obtain an effective control of the target interface, extract coordinate values of all effective controls, generate a character string according to the coordinate values of all the effective controls, and determine whether the character string exists in a traversed interface list, where if yes, it indicates that the target interface is a traversed interface; otherwise, it indicates that the target interface is a non-traversed interface.

Corresponding to the foregoing method, the control list includes a static control sub-list and a dynamic control sub-list, the static control sub-list is used to store a static control at a layer the same as a layer at which a motion control is located, the dynamic control sub-list is used to store a control whose display status is controlled by the motion control, and the control list obtaining unit further includes:

a dynamic control sub-list collection unit, configured to: control the motion control to move according to a preset rule, to obtain a plurality of continuous display interfaces under the target interface; and control the UiAutomator framework to perform detection and add a control in each display interface to the dynamic control sub-list.

Corresponding to the foregoing method, the dynamic control sub-list collection unit includes:

a dynamic control unit, configured to control the motion control to move according to the preset rule from an initial location, to obtain the plurality of continuous display interfaces corresponding to the motion control under the target interface, where when the motion control is located at the initial location, the first control in the display interface corresponding to the motion control is marked as a reference control of a current display interface, the last control is used as a tail control of the current display interface, a tail control of a previous display interface is located in a next display interface, and the tail control of the previous display interface is used as a reference control of the next display interface.

Corresponding to the foregoing method, the foregoing system may further include: a class interface determining unit, configured to: obtain an effective control of the target interface; determine, according to the effective control of the target interface and a effective control of a traversed interface, whether a class interface of the target interface exists in the traversed interface; and if yes, obtain a traversed effective control from the class interface, mark an effective control that is in the target interface and that is the same as the traversed effective control in the class interface as a traversed control, and determine, according to an obtained marking result, whether all the effective controls of the target interface are traversed, where if two interfaces have N different effective controls and N is within an allowable range, the two interfaces are class interfaces of each other.

Corresponding to the foregoing method, the foregoing system may further include:

a jump relationship extraction unit, configured to: each time the interface corresponding to the non-traversed control is entered, store a jump relationship between the non-traversed control and the interface corresponding to the non-traversed control.

Corresponding to the foregoing system, this application further discloses a test device. The test device may be a mobile phone, a computer, a PC, or the like to which any one of the foregoing interface traversing systems is applied.

In the foregoing solution, the tested application may be a current enabled application of a test terminal connected to the test device.

When the tested application may be a current enabled application of a test terminal connected to the test device, to help working personnel traverse all the interfaces, the application interface traversing system is further configured to store stored data information to the test terminal connected to the test device, where the stored data information includes interface layout information, an interface screenshot file, a control list, and a jump relationship between the control and the interface of each traversed interface.

Figure 8:
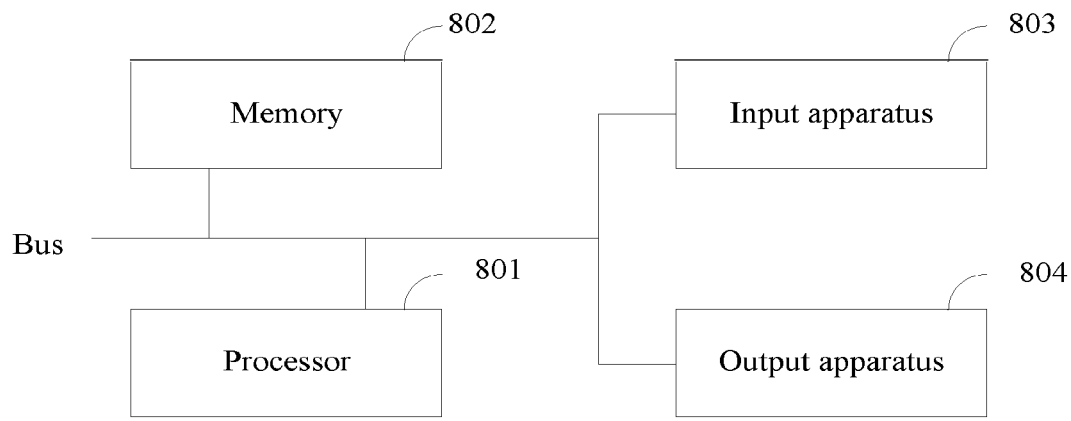
FIG. 8 is a schematic structural diagram of a server according to an embodiment of this application.

An embodiment of this application further provides a server. Referring to FIG. 8, the server may include:

a processor 801, a memory 802, an input apparatus 803, and an output apparatus 804. There may be one or more processors 801 in a browser server. In FIG. 8, one processor is used as an example. In some embodiments of the present disclosure, the processor 801, the memory 802, the input apparatus 803, and the output apparatus 804 may be connected by using a bus. The input apparatus 803 and the output apparatus 804 may be interfaces of a communications module, for example, interfaces of a GSM module. In FIG. 8, an example in which connection is implemented by using a bus is used.

The memory 802 may be configured to store a software program and a module. By running the software program and the module stored in the memory 802, the processor 801 performs various functional applications and data processing of the browser server. The memory 802 may mainly include a program storage area and a data storage area. The program storage area may store an operating system, an application program used by at least one function, and the like. In addition, the memory 802 may include a high speed random access memory, and may further include a non-volatile memory such as at least one magnetic disk storage device, a flash memory, or another volatile solid-state storage device. The input apparatus 803 may be configured to receive input digit or character information, and generate a keyboard signal input related to the user setting and function control of the browser server.

Specifically, in this embodiment, the processor 801 loads, according to the following instructions, executable files corresponding to processes of one or more applications into the memory 802. The processor 801 runs the applications stored in the memory 802, to implement various functions:

when an interface of a tested application is entered, using the entered interface as a target interface;

obtaining a control list of the target interface, and entering, when a non-traversed control, sub-interface, or parent interface exists in the target interface, an interface corresponding to the non-traversed control, the non-traversed sub-interface, or the non-traversed parent interface;

when all controls, sub-interfaces, and parent interfaces of the target interface are traversed, determining whether the target interface is a main interface; and if the target interface is the main interface, determining that application interface traversing is completed; and if the target interface is not the main interface, returning to an upper layer interface of the target interface, using the upper layer interface as the target interface, and performing the obtaining a control list of the target interface.

Optionally, the entering, when a non-traversed control, sub-interface, or parent interface exists in the target interface, an interface corresponding to the non-traversed control, an interface corresponding to a control corresponding to the non-traversed sub-interface, or the non-traversed parent interface includes:

determining whether all the controls of the target interface are traversed; and if a determining result is not, triggering a non-traversed control, and entering an interface corresponding to the non-traversed control; or if a determining result is yes, determining whether a non-traversed sub-interface exists in the target interface; and if yes, entering the non-traversed sub-interface; or if not, determining whether a non-traversed parent interface exists in the target interface; and if yes, entering the non-traversed parent interface; or if not, determining that neither the non-traversed control, the non-traversed sub-interface, nor the non-traversed parent interface exists in the target interface.

Optionally, the obtaining a control list of the target interface includes:

extracting, from a preset database when the target interface is a traversed interface, a control list corresponding to the target interface; or when the target interface is a non-traversed interface, using a control list obtained after the target interface is processed as the control list of the target interface.

Optionally, the extracting, from a preset database when the target interface is a traversed interface, a control list corresponding to the target interface; or when the target interface is a non-traversed interface, using a control list obtained after the target interface is processed as the control list of the target interface includes:

processing the target interface, to obtain the control list of the target interface; determining, according to the control list, whether the target interface is a traversed interface; and when the target interface is a traversed interface, extracting the control list of the target interface from the preset database, and using the control list as the control list of the target interface; or if the target interface is a non-traversed interface, processing the target interface, using the obtained control list as the control list of the target interface, and storing the control list to the preset database.

Optionally, the processing the target interface, to obtain the control list of the target interface includes:

testing the target interface by using a UiAutomator framework, to obtain the control list matching the target interface; and the determining, according to the control list, whether the target interface is a traversed interface includes:

traversing the control list obtained after the target interface is tested, to obtain an effective control of the target interface, extracting coordinate values of all effective controls, generating a character string according to the coordinate values of all the effective controls, and determining whether the character string exists in a traversed interface list, where if yes, it indicates that the target interface is a traversed interface; otherwise, it indicates that the target interface is a non-traversed interface.

Optionally, the testing the target interface by using a UiAutomator framework, to obtain the control list matching the target interface includes:

obtaining the control list obtained after the target interface is tested by using the UiAutomator framework, where the control list includes a static control sub-list and a dynamic control sub-list; and a process of obtaining the dynamic control sub-list is:

controlling a motion control to move according to a preset rule, to obtain a plurality of continuous display interfaces under the target interface; and performing detection by using the UiAutomator framework and adding a control in each display interface to the dynamic control sub-list.

Optionally, the controlling a motion control to move according to a preset rule, to obtain a plurality of continuous display interfaces under the target interface includes:

controlling the motion control to move according to the preset rule from an initial location, to obtain the plurality of continuous display interfaces corresponding to the motion control under the target interface, where when the motion control is located at the initial location, the first control in the display interface corresponding to the motion control is marked as a reference control of a current display interface, the last control is used as a tail control of the current display interface, a tail control of a previous display interface is located in a next display interface, and the tail control of the previous display interface is used as a reference control of the next display interface.

Optionally, the determining whether all the controls of the target interface are traversed includes:

obtaining the control list of the target interface; determining, according to the control list of the target interface and a control list of a traversed interface, whether a class interface of the target interface exists in the traversed interface; and if yes, obtaining a traversed effective control from the class interface; and marking an effective control that is in the control list of the target interface and that is the same as the traversed effective control in the class interface as a traversed control, and determining, according to an obtained marking result, whether all the effective controls of the target interface are traversed, where if two interfaces have N different effective controls and N is within an allowable range, the two interfaces are class interfaces of each other.

Optionally, after the entering an interface corresponding to the non-traversed control, the method further includes:

marking the non-traversed control as a traversed control in the control list; and storing a jump relationship between the non-traversed control and the interface corresponding to the non-traversed control.

An embodiment of this application further provides a storage medium, configured to store program code, and the program code is used to perform any implementation of the application interface traversing method according to the foregoing embodiments.

An embodiment of this application further provides a computer program product including an instruction, and when the computer program product including an instruction running on a computer, the computer is caused to perform any implementation of the application interface traversing method according to the foregoing embodiments.

For ease of description, when the foregoing system is described, the system is divided into modules according to functions, which are separately described. Certainly, during implementation of this application, the functions of the modules may be implemented in a same piece of or a plurality of pieces of software and/or hardware.

The embodiments in this specification are all described in a progressive manner, for same or similar parts in the embodiments, refer to these embodiments, and descriptions of each embodiment focus on a difference from other embodiments. In particular, for the system or system embodiments, it is basically similar to the method embodiment and therefore is described simply, and for a related part, refer to the part of the descriptions of the method embodiment. The described system or system embodiment is merely exemplary. The units described as separate parts may or may not be physically separated, and parts displayed as units may or may not be physical units, which may be located in one position, or may be distributed on a plurality of network elements. Some or all of the modules may be selected according to actual needs to achieve the objectives of the solutions of the embodiments. A person of ordinary skill in the art may understand and implement the embodiments.

Persons skilled in the art may further realize that, in combination with examples of units and algorithm steps described according to the embodiments disclosed in the present disclosure, this application can be implemented with electronic hardware, computer software, or a combination thereof. To clearly describe the interchangeability between the hardware and the software, compositions and steps of each example have been generally described according to functions in the foregoing descriptions. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

Steps of the method or algorithm described in combination with the embodiments disclosed in the present disclosure may be directly implemented by using hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable magnetic disk, a CD-ROM, or any storage medium of other forms well-known in the technical field.

In the present disclosure, relational terms such as first and second are used to distinguish one entity or operation from another entity or operation, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a series of elements not only includes those elements but also includes other elements which are not expressly listed, or further includes inherent elements of the process, the method, the article, or the device. Unless otherwise specified, an element limited by "include a/an . . . " does not exclude other same elements existing in the process, the method, the article, or the device that includes the element.

For the foregoing descriptions of the disclosed embodiments, it is obvious to persons skilled in the art that they can implement or use various modifications to these embodiments, so that the general principles defined in the present disclosure may be implemented in other embodiments without departing from the spirit and scope of the present disclosure. Therefore, this application is not limited to these embodiments illustrated in the present disclosure, but needs to conform to the broadest scope consistent with the principles and novel features disclosed in the present disclosure.

What is claimed is:

1. An application interface traversing method, comprising:
    selecting, by processing circuitry of an apparatus, a target user interface from a plurality of user interfaces of an application to be tested, the target user interface being associated with at least one of a control element, a sub-interface, and a parent interface;
    obtaining a first control list for the target user interface, the first control list indicating whether the at least one of the control element, the sub-interface, and the parent interface has been traversed;
    determining whether the first control list indicates that the target user interface is associated with a non-traversed user interface corresponding to one of the at least one of the control element, the sub-interface, and the parent interface; and
    when the target user interface is determined to be associated with the non-traversed user interface, selecting the non-traversed user interface to update the first control list.

2. The application interface traversing method according to claim 1, wherein
    the plurality of user interfaces includes an uppermost user interface; and
    the application interface traversing method further includes:
    when the target user interface is determined not to be associated with the non-traversed user interface, determining whether the target user interface is the uppermost user interface;
    when the target user interface is determined to be the uppermost user interface, determining that each of the plurality of user interfaces has been traversed; and
    when the target user interface is determined not to be the uppermost user interface,
        selecting an upper layer user interface of the target user interface; and
        updating the target user interface to be the upper layer user interface.

3. The application interface traversing method according to claim 2, wherein the determining whether the target user interface is associated with the non-traversed user interface further comprises:
    determining whether the target user interface is associated with a control element that is not traversed; and
    when the target user interface is determined not to be associated with the non-traversed control element, determining whether the target user interface is associated with a sub-interface that is not traversed; and
    when the target user interface is determined not to be associated with the non-traversed sub-interface,
        determining whether the target user interface is associated with a parent interface that is not traversed; and
        when the target user interface is determined not to be associated with the non-traversed parent interface, determining that the target user interface is not associated with the non-traversed user interface.

4. The application interface traversing method according to claim 1, the obtaining the first control list comprises:
    when the target user interface is associated with a traversed one of the at least one of the control element, the sub-interface, and the parent interface, obtaining, from a preset database, the first control list corresponding to the target user interface; and
    when the target user interface is not traversed, obtaining a second control list by processing the target user interface, the first control list being identical to the second control list.

5. The application interface traversing method according to claim 1, further comprising:
    processing the target user interface to obtain a second control list for the target user interface;
    determining, according to the second control list, whether the target user interface is associated with a traversed one of the at least one of the control element, the sub-interface, and the parent interface;
    when the target user interface is determined to be traversed, obtaining, from a preset database, the first control list corresponding to the target user interface; and
    when the target user interface is determined not to be traversed,
    setting the second control list to be the first control list; and
    storing the second control list into the preset database.

6. The application interface traversing method according to claim 5, wherein
the processing the target user interface further includes:
obtaining the second control list that matches the target user interface by testing the target user interface with a UiAutomator testing framework; and
the determining whether the target user interface is traversed includes:
traversing the second control list to obtain one or more effective control elements of the target user interface, the one or more effective control elements including one or more of clickable control elements, static control elements, dynamic control elements, and text control elements;
generating coordinate information that indicates coordinate values for the one or more effective control elements; and
determining whether the target user interface is traversed based on the generated coordinate information and a traversed user interface list that includes coordinate information for a set of traversed user interfaces of the plurality of user interfaces.

7. The application interface traversing method according to claim 6, wherein
the second control list includes a static control sub-list and a dynamic control sub-list; and
the obtaining the second control list includes obtaining the dynamic control sub-list by
moving a motion control element according to a preset rule to obtain a plurality of continuous display interfaces for the target user interface;
detecting, by the UiAutomator testing framework, one or more control elements in each of the plurality of continuous display interfaces; and
adding the one or more control elements in the respective display interfaces to the dynamic control sub-list.

8. The application interface traversing method according to claim 7, wherein
the moving the motion control element includes moving, according to the preset rule, the motion control element from a first location to a second location;
a first display interface of the plurality of continuous display interfaces corresponds to the motion control element at the first location, a first control element in the first display interface is marked as a first reference control element of the first display interface, a last control element in the first display interface is a tail control element of the first display interface; and
a second display interface of the plurality of continuous display interfaces corresponds to the motion control element at the second location, and the tail control element of the first display interface is in the second display interface and is used as a second reference control element of the second display interface.

9. The application interface traversing method according to claim 3, the determining whether the target user interface is associated with the non-traversed control element comprises:
determining, according to the first control list and a traversed user interface list corresponding to a set of traversed user interfaces of the plurality of user interfaces, whether the set of traversed user interfaces includes a similar user interface of the target user interface;
when the set of traversed user interfaces includes the similar user interface of the target user interface, obtaining one or more traversed effective control elements from the similar user interface;
for each of one or more effective control elements in the first control list, when the respective effective control element is identical to one of the one or more traversed effective control elements in the similar user interface, marking the respective effective control element in the first control list as being traversed; and
determining, based on a marking result, whether the one or more effective control elements in the target user interface is traversed;
wherein a number of different effective control elements between the target user interface and the similar user interface is less than N, N being a positive integer.

10. The application interface traversing method according to claim 3, further comprising:
when the target user interface is determined to be associated with the non-traversed control element,
triggering the non-traversed control element;
selecting the non-traversed user interface corresponding to the non-traversed control element;
updating the first control list by marking the non-traversed control element as a traversed control element in the first control list; and
storing a jump relationship between the non-traversed control element and the non-traversed user interface corresponding to the non-traversed control element.

11. An apparatus, comprising processing circuitry configured to:
select a target user interface from a plurality of user interfaces of an application to be tested, the target user interface being associated with at least one of a control element, a sub-interface, and a parent interface;
obtain a first control list for the target user interface, the first control list indicating whether the at least one of the control element, the sub-interface, and the parent interface has been traversed;
determine whether the first control list indicates that the target user interface is associated with a non-traversed user interface corresponding to one of the at least one of the control element, the sub-interface, and the parent interface; and
when the target user interface is determined to be associated with the non-traversed user interface, select the non-traversed user interface to update the first control list.

12. The apparatus according to claim 11, wherein
the plurality of user interfaces includes an uppermost user interface; and
the processing circuitry is further configured to:
when the target user interface is determined not to be associated with the non-traversed user interface, determine whether the target user interface is the uppermost user interface;
when the target user interface is determined to be the uppermost user interface, determine that each of the plurality of user interfaces has been traversed; and
when the target user interface is determined not to be the uppermost user interface, select an upper layer user interface of the target user interface; and
update the target user interface to be the upper layer user interface.

13. The apparatus according to claim 12, wherein the processing circuitry is further configured to:
determine whether the target user interface is associated with a control element that is not traversed; and when the target user interface is determined not to be associated with the non-traversed control element, determine whether the target user interface is associated with a sub-interface that is not traversed; and
when the target user interface is determined not to be associated with the non-traversed sub-interface, determine whether the target user interface is associated with a parent interface that is not traversed; and
when the target user interface is determined not to be associated with the non-traversed parent interface, determine that the target user interface is not associated with the non-traversed user interface.

14. The apparatus according to claim 11, wherein
when the target user interface is associated with a traversed one of the at least one of the control element, the sub-interface, and the parent interface, obtain, from a preset database, the first control list corresponding to the target user interface; and
when the target user interface is not traversed, obtain a second control list by processing the target user interface, the first control list being identical to the second control list.

15. The apparatus according to claim 11, wherein the processing circuitry is further configured to:
process the target user interface to obtain a second control list for the target user interface;
determine, according to the second control list, whether the target user interface is associated with a traversed one of the at least one of the control element, the sub-interface, and the parent interface;
when the target user interface is determined to be traversed, obtain, from a preset database, the first control list corresponding to the target user interface; and
when the target user interface is determined not to be traversed,
set the second control list to be the first control list; and
store the second control list into the preset database.

16. The apparatus according to claim 15, wherein the processing circuitry is further configured to:
obtain the second control list that matches the target user interface by testing the target user interface with a UiAutomator testing framework;
traverse the second control list to obtain one or more effective control elements of the target user interface, the one or more effective control elements including one or more of clickable control elements, static control elements, dynamic control elements, and text control elements;
generate coordinate information that indicates coordinate values for the one or more effective control elements; and
determine whether the target user interface is traversed based on the generated coordinate information and a traversed user interface list that includes coordinate information for a set of traversed user interfaces of the plurality of user interfaces.

17. The apparatus according to claim 16, wherein
the second control list includes a static control sub-list and a dynamic control sub-list; and
the processing circuitry is further configured to obtain the dynamic control sub-list by
moving a motion control element according to a preset rule to obtain a plurality of continuous display interfaces for the target user interface;

detecting, by the UiAutomator testing framework, one or more control elements in each of the plurality of continuous display interfaces; and
adding the one or more control elements in the respective display interfaces to the dynamic control sub-list.

18. The apparatus according to claim 13, wherein the processing circuitry is further configured to:
determine, according to the first control list and a traversed user interface list corresponding to a set of traversed user interfaces of the plurality of user interfaces, whether the set of traversed user interfaces includes a similar user interface of the target user interface;
when the set of traversed user interfaces includes the similar user interface of the target user interface, obtain one or more traversed effective control elements from the similar user interface;
for each of one or more effective control elements in the first control list, when the respective effective control element is identical to one of the one or more traversed effective control elements in the similar user interface, mark the respective effective control element in the first control list as being traversed; and
determine, based on a marking result, whether the one or more effective control elements in the target user interface is traversed; and
a number of different effective control elements between the target user interface and the similar user interface is less than N, N being a positive integer.

19. The apparatus according to claim 13, wherein when the target user interface is determined to be associated with the non-traversed control element, the processing circuitry is further configured to:
trigger the non-traversed control element;
select the non-traversed user interface corresponding to the non-traversed control element;
update the first control list by marking the non-traversed control element as a traversed control element in the first control list; and
store a jump relationship between the non-traversed control element and the non-traversed user interface corresponding to the non-traversed control element.

20. A non-transitory computer-readable storage medium storing a program executable by a processor to perform:
selecting, by processing circuitry of an apparatus, a target user interface from a plurality of user interfaces of an application to be tested, the target user interface being associated with at least one of a control element, a sub-interface, and a parent interface;
obtaining a first control list for the target user interface, the first control list indicating whether the at least one of the control element, the sub-interface, and the parent interface has been traversed;
determining whether the first control list indicates that the target user interface is associated with a non-traversed user interface corresponding to one of the at least one of the control element, the sub-interface, and the parent interface; and
when the target user interface is determined to be associated with the non-traversed user interface, selecting the non-traversed user interface to update the first control list.

* * * * *